United States Patent [19]

Frees

[11] 4,300,867

[45] Nov. 17, 1981

[54] PUSH-PULL APPARATUS FOR WALKIE FORK TRUCK

[75] Inventor: Kenneth A. Frees, St. Peters, Mo.

[73] Assignee: Missouri Research Laboratories, Inc., St. Charles, Mo.

[21] Appl. No.: 132,266

[22] Filed: Mar. 20, 1980

[51] Int. Cl.³ .......... B60P 1/16

[52] U.S. Cl. .......... 414/493; 414/607; 414/661

[58] Field of Search .......... 414/491, 492, 493, 607, 414/661

[56] References Cited

U.S. PATENT DOCUMENTS

| | | | |
|---|---|---|---|
| 3,495,730 | 2/1970 | Rigsby | 414/492 X |
| 4,065,012 | 12/1977 | Rocco | 414/642 X |
| 4,217,074 | 8/1980 | Leasor et al. | 414/661 X |

OTHER PUBLICATIONS

"Moto-Truc MTP-WJ", Otis Elevator Company, Cleveland, Ohio, May 1976.

*Primary Examiner*—James L. Rowland

*Attorney, Agent, or Firm*—Kalish & Gilster

[57] ABSTRACT

A modular push-pull unit is provided for installation upon a walkie type fork lift pallet truck of the type having a power unit with tiller-operated drive wheel at one end and a pair of controllably liftable forks at the other with an apron proximate the power unit liftable with the forks. The forks are provided with bearings for tiltably mounting a split platen of the push-pull unit, which includes an upright frame interconnected with the apron by hydraulic cylinders for controlling tilt of the platen. The upright frame carries a scissors mechanism having a pusher plate adapter for pushing and pulling movement across the platen.

4 Claims, 11 Drawing Figures

PUSH-PULL APPARATUS FOR WALKIE FORK TRUCK

BACKGROUND AND SUMMARY OF THE INVENTION

The present invention relates to industrial trucks and, more particularly, to the provision of a so-called push-pull unit for fork lift pallet trucks of the walkie type.

Heretofore, it has been known to provide industrial trucks with so-called pusher and push-pull apparatus wherein there is carried at the front of the truck a platen and frame mounted to a mast of the truck whereby elevation and tilt of the platen is provided by the truck. The frame carries a hydraulicly actuatable scissors linkage for movement of a pusher plate for pushing and/or pulling, with said pusher plate typically having gripper jaws for seizing a cardboard slip sheet having a load thereon, whereby the same may be pulled onto the platen.

Such "pushers and push-pulls" have fairly recently become widely accepted as an alternative to fork lift mechanisms for lifting and transporting a conventionally palletized load, i.e. making use of the ubiquitous variety of wooden pallets. The use of this recent development is referred to as "palletless" handling since loading, unloading and stacking of loads may be accomplished readily without use of conventional pallets.

There are in wide-spread usage small motorized forklift pallet trucks of the so-called walkie type having a power unit with a tiller-operated drive wheel for operating the vehicle while the operator stands or walks next to the truck, where he may control raising and lowering of a pair forks of picking up and transporting a conventional pallet or palletized load. But heretofore such walkie fork lift trucks have not been utilizable for palletless handling.

An object of the present invention is to provide apparatus for the equippage of fork lift trucks with push-pull means.

A further object of the invention is to provide push-pull apparatus of the character stated which can be installed upon a fork lift pallet truck of the walkie type for permitting palletless handling.

A further object of the invention is to provide push-pull apparatus of the character stated which not only is of modular character for facile, simple installation upon a walkie-type fork lift truck but also is user installable.

A still further object of the invention is to provide push-pull apparatus of the character stated which can be installed upon such walkie fork lift truck with but simple, easily effected modification of the fork lift truck.

Another object of the invention is to provide a push-pull apparatus of the character stated which can be installed upon a walkie fork lift truck without destroying the general character and operation of the truck and which permits a conventional pallet or palletized load to be picked up and carried.

Another object of the invention is to provide a forklift truck of the walkie type adapted for handling of palletless loads.

Among other objects of the invention may be noted the provision of such push-pull apparatus and truck which is compact, economically manufactured and of rugged, long-lasting and reliable in use, and which speeds and facilitates loading, unloading and stacking of palletless loads while preventing load damage.

Other objects and features will be in part apparent and in part pointed out hereinbelow.

BRIEF DESCRIPTION OF THE DRAWINGS

Corresponding reference characters indicate corresponding parts throughout the several views of the drawing.

DESCRIPTION OF THE PREFERRED EMBODIMENT

Figure 1:
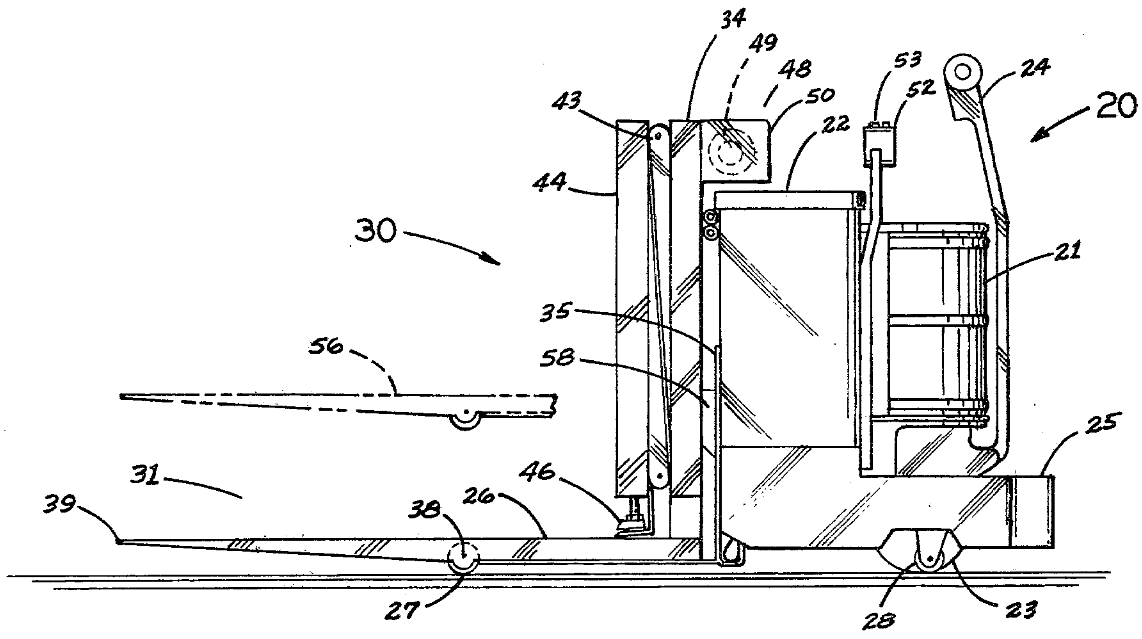
FIG. 1 is side elevation of a walkie type fork lift pallet truck equipped with a push-pull unit constructed in accordance with and embodying the present invention.
Figure 2:
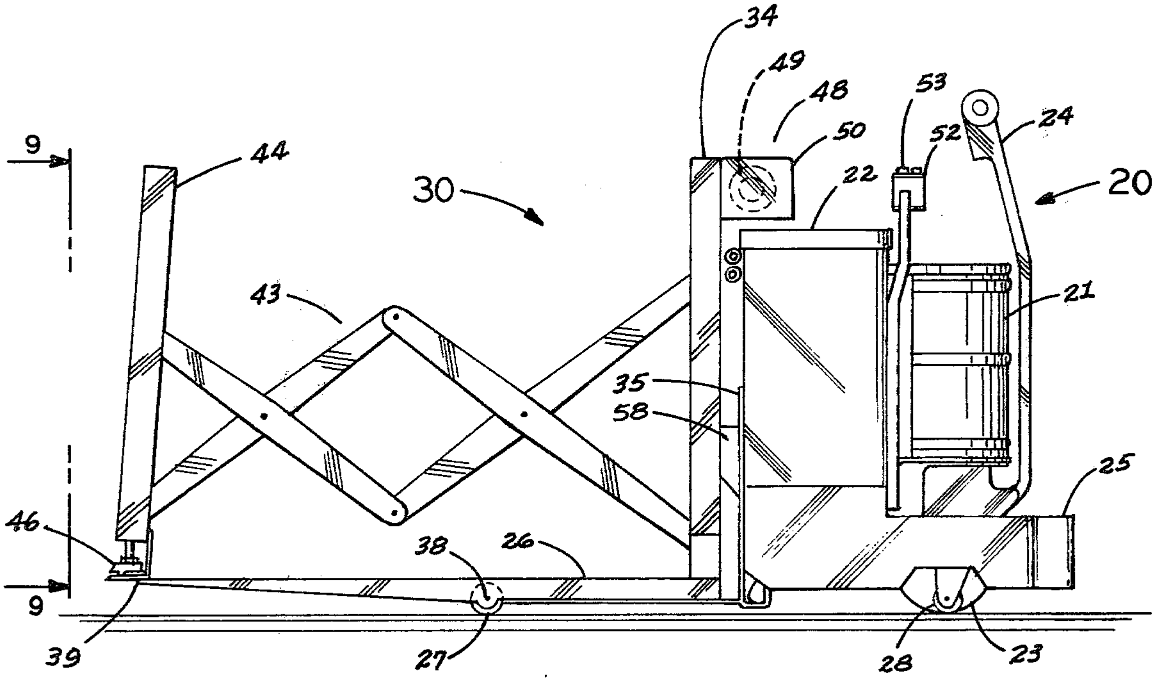
FIG. 2 is a side elevation of the fork lift truck with a scissors mechanism of the push-pull unit extended.

Referring to the drawings, designated at 20 is a conventional fork-lift pallet truck of the so-called walkie type having a power unit 21 including a battery and equipment compartment 22. Said power unit includes a single large drive wheel 23 for supporting one end of the truck and providing motive power. Drive wheel 23 is adapted to be steered and controlled in forward and reverse directions by a tiller 24 which may be swung down for permitting steering and other control operation by an operator while standing or walking next to a base 25 of the truck, as well as while seated upon power unit 21.

Extending in the opposite direction from battery compartment 21 are a pair of liftable forks 26, 26' (see FIG. 5) which have small wheels 27, 27' therebeneath for supporting the other end of the truck. Small auxiliary wheels 28 may be located at the driving end of the vehicle for protection against tipping.

In accordance with the invention, truck 20 is equipped with a push-pull unit 30 which includes a split platen 31 having in actuality two platen members 32, 32' (see particularly FIGS. 3 and 6) which are tiltably mounted upon the respective forks 26, 26'. Said platen members extend well outwardly beyond wheels 27, 27' in cantilever fashion being integrably secured to an upright frame 34 located adjacent a vertical plate constituting an apron or back frame 35 of the truck.

Plate 35 is liftable with forks 26, 26' and is proximate the rear wall 37 battery compartment 27 for protecting it from a palletized load, it being understood that forks 26, 26' are normally intended for raising and transporting a conventional pallet or a palletized load. In this regard, Forks 26, 26' typically have a very low height, e.g. about 3 inches whereby they can extend between upper and lower slats or boards of a conventional pallet. The truck is adapted to raise the forks several inches for lifting such a pallet.

Figure 4:
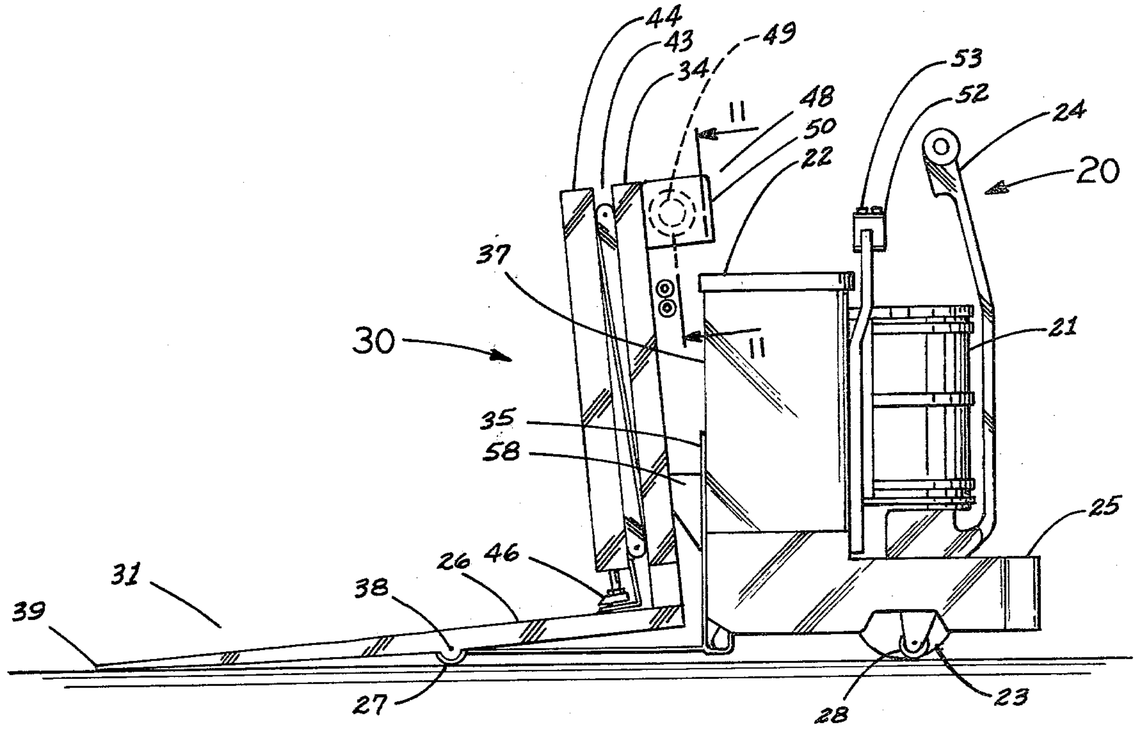
FIG. 4 is a side elevation of the truck with a platen of the push-pull unit tilted for surface contact.

Frame 34 is interconnected with plate 35 by extensible-retractable motor means, contributed by a hydraulic cylinder arrangement described below, for controlling the tilting of platen 31 about an axis 38 as may be seen by comparing FIG. 1 with FIG. 4, to permit relatively sharp thin edges 39, 39' of members 32, 32' to be placed at ground level for being extended under the edge of a slip sheet 40 upon which a load 41 has been placed.

Frame 34 carries a scissors mechanism designated generally at 43 adapted for being extended and retracted under hydraulic control as more fully explained below and carrying a pusher plate 44 oriented for pushing and pulling movement across platen 31 as appreciated by comparing FIGS. 7 and 8.

Figure 7:
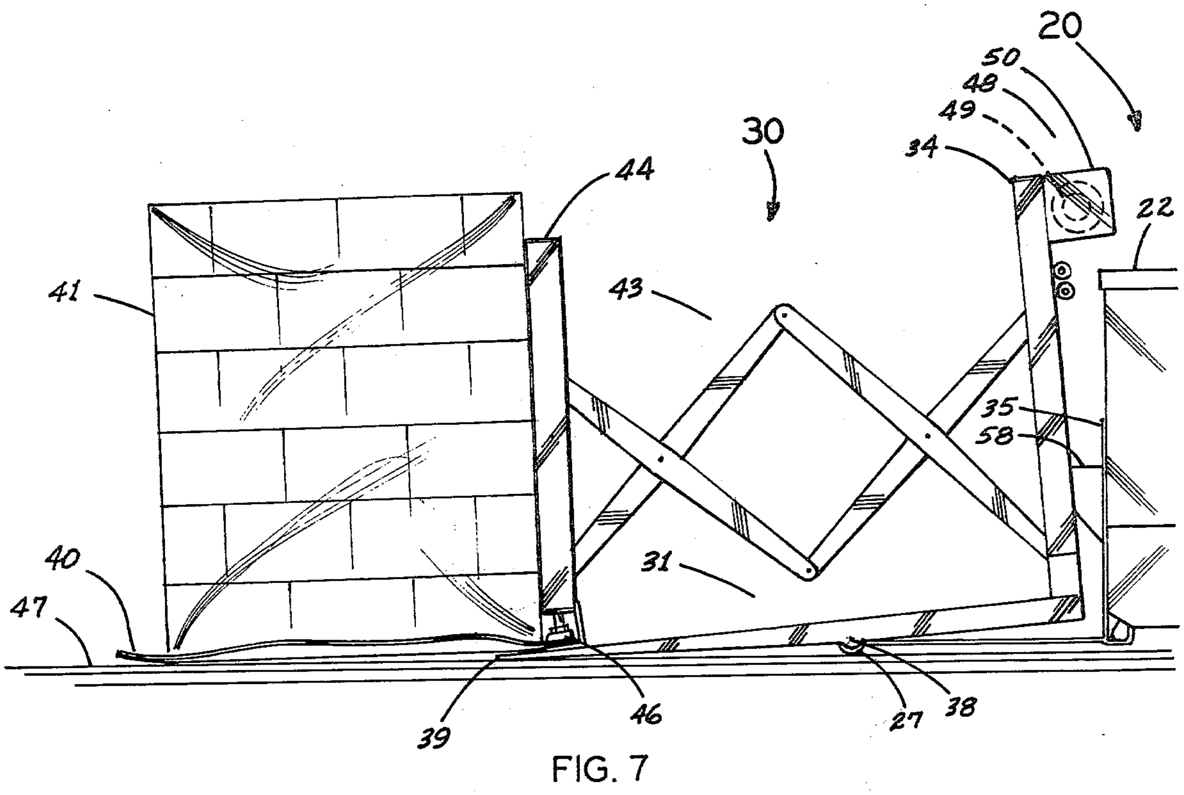
FIG. 7 is a side elevation of the push-pull unit as installed on the truck, illustrating slip sheet engagement by gripper jaws of the unit.
Figure 8:
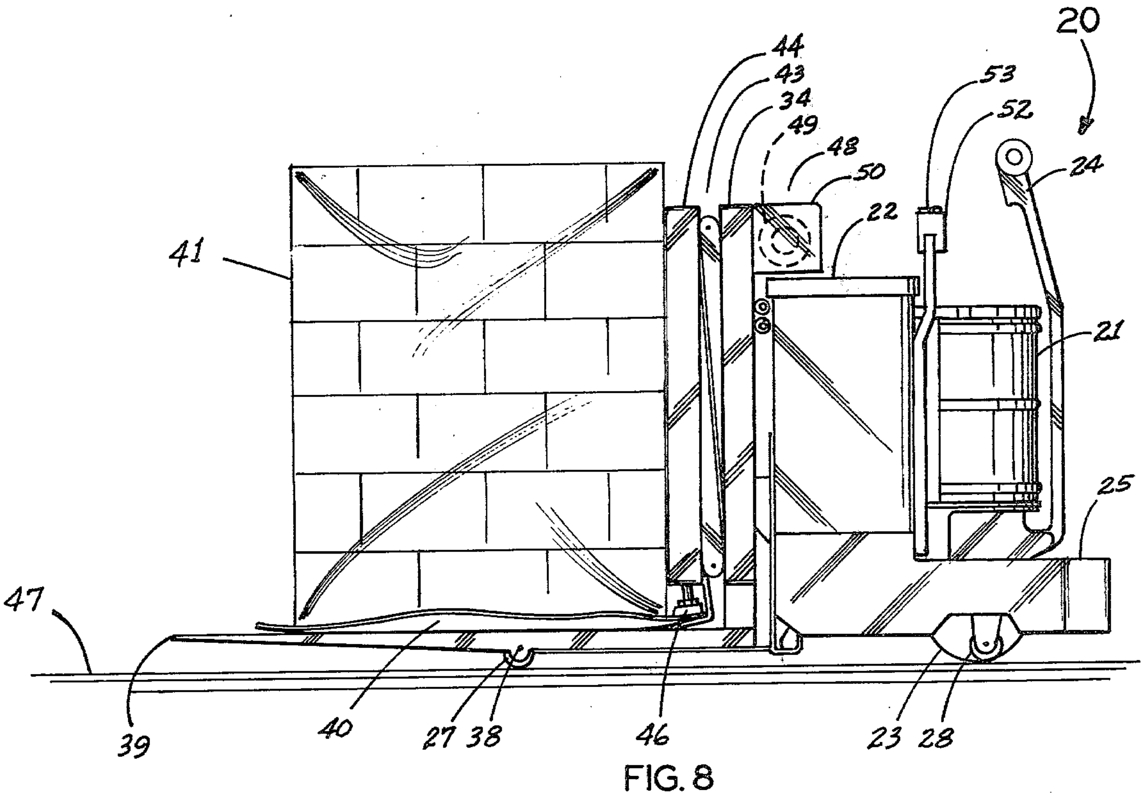
FIG. 8 is a side elevation of the push-pull unit and truck, illustrated the slip sheet and load having been pulled onto a platen of the unit.

At the lower edge of pusher plate 44 is a gripper jaws mechanism 46 suited for gripping the edge of a slip sheet, as seen in FIG. 7, wherein slip sheet 40 is seized by the gripper jaws for being pulled onto platen 31 upon retraction of scissors mechanism 43 thereby to relocate the load 41 from an adjacent surface 47, as in FIG. 7, to the platen 31, as in FIG. 8.

For providing hydraulic fluid under pressure for operation of the hydraulic cylinders which control tilting of platen 31, extension and retraction of scissors mechanism 43, as well as operation of the gripper jaw mechanism 46, there is provided at the top and to one side of frame 34 a hydraulic power unit 48 and a hydraulic motor-pump 49 within a protective shroud or housing 50, various conventional solenoid valves, connected as well known in the art and thus not illustrated, also are located within housing 50 for controlling distribution of hydraulic fluid under pressure to the various hydraulic cylinders. Said hydraulic power unit is connected for receiving electric power from batteries within compartment 22.

Conventionally carried upon truck 20 just above power unit 21 is a control box 52 and, in accordance with equipping the truck with push-pull unit 30, there are additionally provided at the upper surface of box 52, additional pushbuttons 53 for controlling the above-stated solenoids and motor-pump 49.

A further function of the new push-pull equipped fork truck is that, because platen 31 is defined by individual platen members 32, 32' defining a slot 55 between them, convention pallets can be picked up and carried. For this purpose, lifting of forks 26, 26', which with plate 35, carry the push-pull unit 30 in its entirety, provides lifting of members 32, 32' as indicated in phantom at 56 in FIG. 1. Members 32, 32' thus will lift and carry a conventional pallet, even though the pallet may have a central stiffening web or support, since such is accommodated by slot 55.

Figure 5:
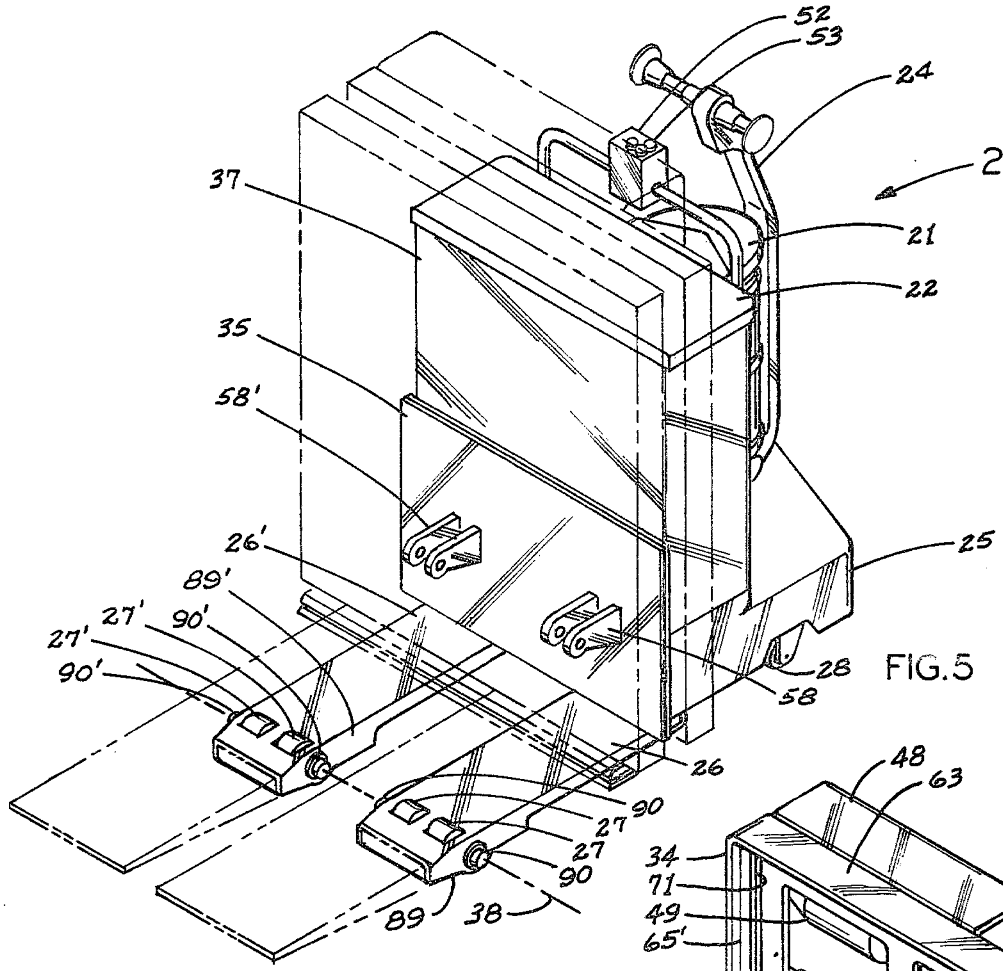
FIG. 5 is a perspective view of the truck illustrating the provision of certain features for accommodating the push-pull unit.

Referring to FIG. 5, apron 35 is provided with pairs of brackets 58, 58' serving as yokes for mounting of hydraulic cylinders 59, 59' (FIG. 6) which provide the tilt function. Said cylinders have their actuating rods interconnected with corresponding pairs of brackets 60, 60' which are carried by a transverse frame member 61 of back frame 34.

Frame 34 is rectangular, having upper and lower principal frame members 63, 64 and side members 65, 65' all of L-section stock. Connected to the side members are the proximal ends of pairs of scissors links 66, 66' and 67, 67'. These in turn have pivotally extending from their distal ends similar links 68, 68' and 69, 69', having distal ends interconnected with pusher plate 44.

Figure 6:
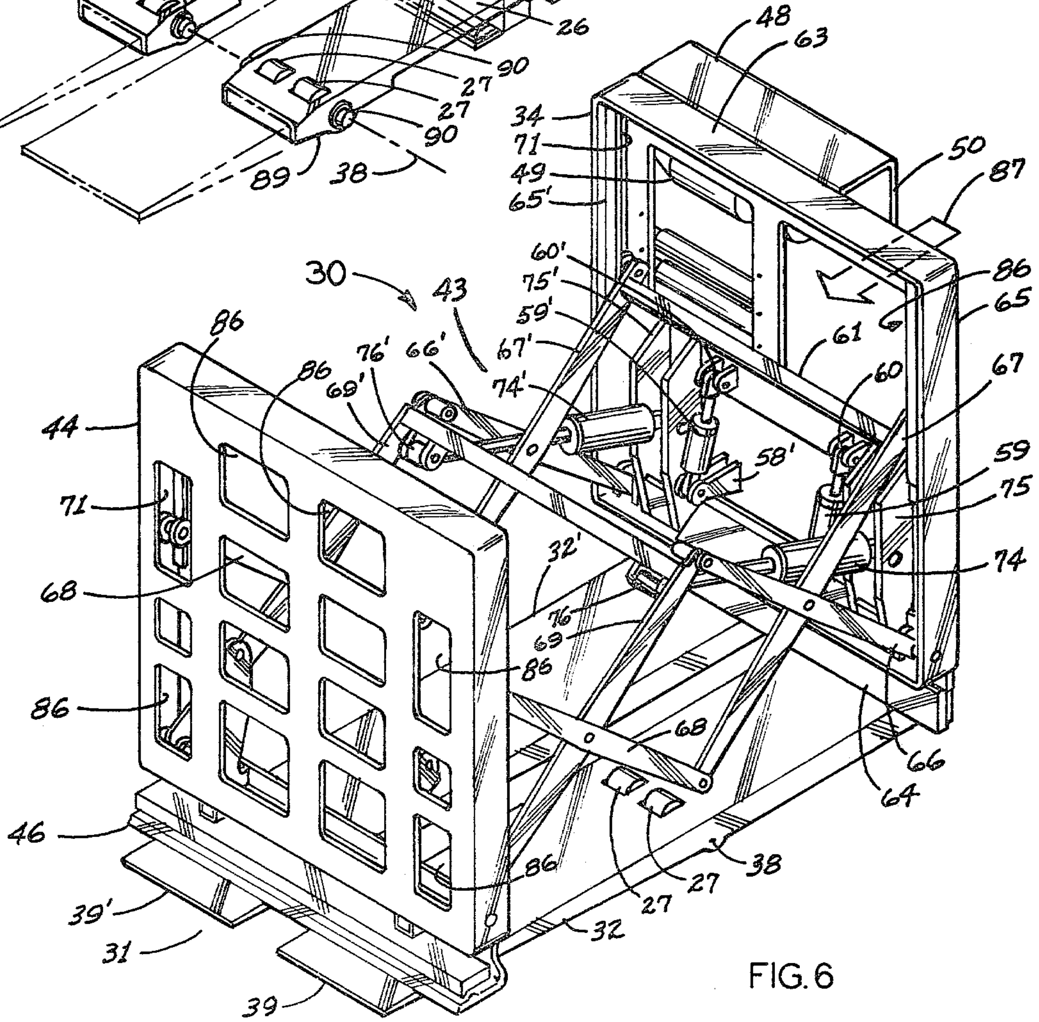
FIG. 6 is a perspective view of the push-pull unit before installation upon the truck, with the scissors mechanism shown extended.

Links 67, 67' have their proximal ends connected to frame members 65, 65' by roller engagement within channels, as indicated at 71 in FIG. 6, their being similar roller engagement of outer ends of links 68, 68' with channels of pusher plate 44, as indicated at 72. Accordingly, a degree of parallelism is actuated between frame 34 and pusher plate 44 upon extension and retraction of the scissors links, which functions are produced by the action of hydraulic cylinders 74, 74'. These are journalled at one end between respective pairs of brackets 75, 75', their actuating rods being pivotally connected by auxiliary links 76, 76' to the points of pivotal interconnection of links 66, 66' with links 69, 69'.

Figure 9:
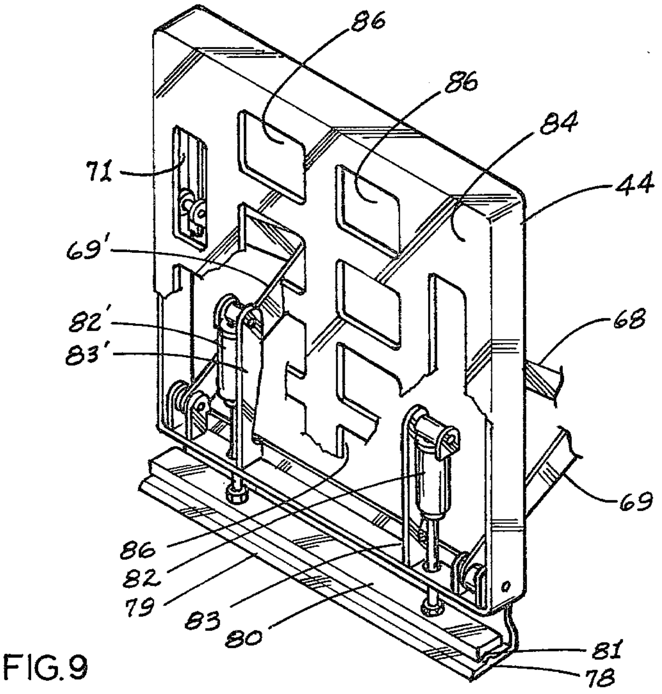
FIG. 9 is a fragmentary frontal perspective view of portions of a certain pusher plate and gripper jaw mechanism of the unit, taken along a line 9—9 shown in FIG. 2.

With reference now to FIG. 9, the gripper jaw mechanism 46 is provided by a lower jaw member 78 which depends from the lower edge of plate 44 and defines a relatively sharp lip 79, there being an upper jaw member 80 for clampingly engaging member 78, each having complementary mating teeth as at 81 for tightly gripping a slip sheet, as at 40 in FIG. 7. Jaw member 80 is pivotally secured at the lower ends of actuating rods of a pair of hydraulic cylinders 82, 82' carried by brackets 83, 83' of the pusher plate.

The front surface 85 of the pusher is provided with several large apertures, as at 86, whereby the operator has a relatively unobstructed view of a load carried upon a slip sheet. Further, hydraulic power unit 48 is located at one side of frame 34, and enclosure 50 is of limited width, so that there is created a sizable aperture or window 86 (FIG. 6) through which the operator 15 provided with a sight as demonstrated by an arrow 87 for easily observing pushing and pulling operations as well as for facilitating precise close-in maneuvering of the truck when using tiller 24 if standing or walking adjacent base 25.

Figure 3:
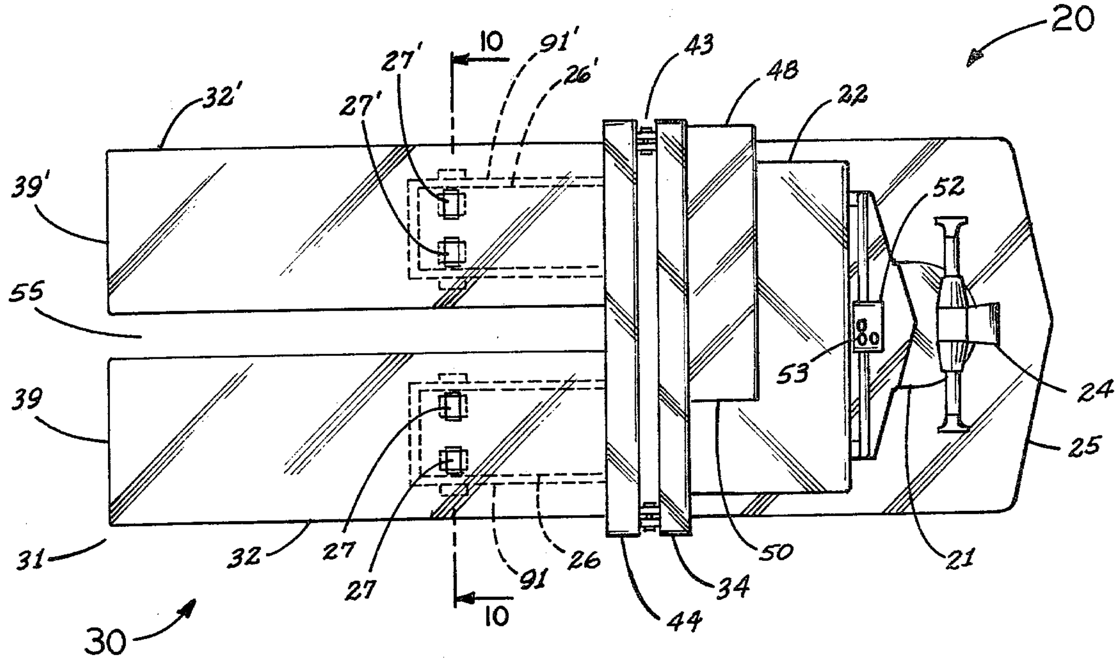
FIG. 3 is a top plan view of the truck and push-pull unit.
Figure 10:
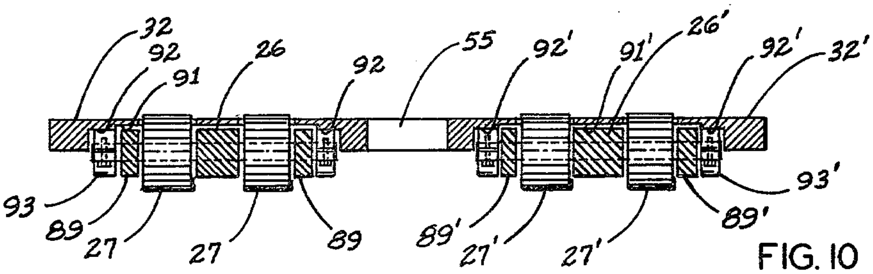
FIG. 10 is a horizontal cross-sectioned view taken generally along line 10—10 in FIG. 3, illustrated certain bearing features.
Figure 11:
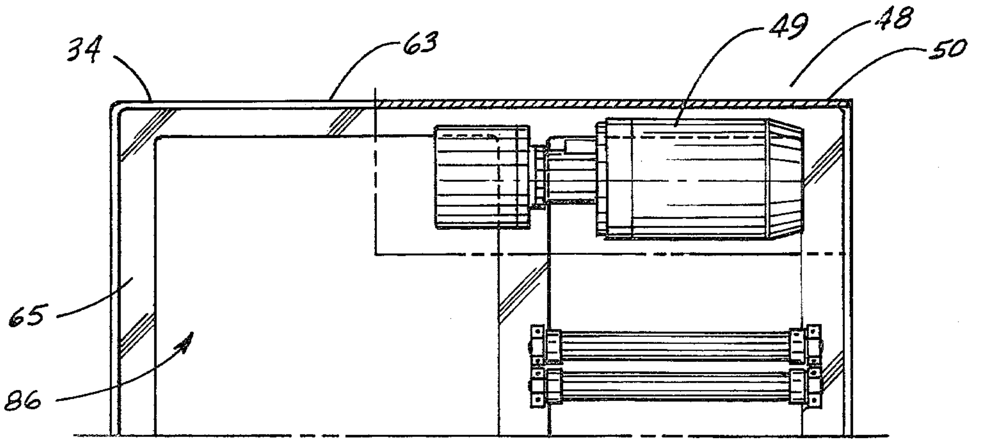
FIG. 11 is a vertical cross-section of a hydraulic power unit of the new push-pull mechanism, taken generally along line 11—11 in FIG. 4.

Referring to FIG. 3 the provision of bearings upon forks 26, 26' for tilting of unit 30 is illustrated. Each of forks 26, 26' has side walls, as at 89, 89' which enclose wheels 27, 27'. For equippage of the push-pull unit, there are welded to said side walls cylindrical studs 90, 90' substantially in line with the wheels and thereby defining tilt axis 38. As shown in FIGS. 4 and 10, each platen member 32, 32' has formed in its bottom surface a rectangular recess 91, 91' slightly greater than but corresponding in shape to the respective fork 26, 26' and with said recesses 90,90' being nearly the depth of the platen members. Recesses 91, 91' are provided with small recess extensions 92, 92' which are dimensioned for journalling studs 90, 90', there being caps 93, 93' bolted to the bottom surface of the platen members for retaining the studs in these journal recesses.

The provision of recesses 91, 91' allows almost the full thickness of platen members 32, 32' to be accommodated whereby the platen 31 is almost nearly the height of the forks 32, 32', adding very little thickness indeed. Thus also, push-pull unit 30 does not preclude conventional insertion between the upper and lower members of a conventional pallet, as well as reducing the overall height of platen 31 to an absolute minimum. This conduces to easy pulling of a slip sheet onto the platen.

Operation is demonstrated in FIG. 7. Platen 31 is tilted forward, it being seen that frame 34 and hydraulic power unit 48 similarly tilt with the platen. Truck 20 is maneuvered to bring the platen edges 39, 39' under the edge of the slip sheet 40. Scissors mechanism 43 is then extended by the operator until pusher plate 44 lies against load 46. Prior to retraction of the scissors mechanism, gripper jaws 46 clamp the edge of the slip sheet. Upper retraction, the scissors mechanism pulls pusher plate 44 back across the platen until the plate is once more flush with frame 34, as in FIG. 8, and thereby pulling load 41 onto the platen, which is then tipped rearwardly to orient the platen parallel with surface 47, where the truck may transport the load as desired. For unloading scissors mechanism 43 is extended, pusher plate 44, pushing the load from the platen.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be secured by Letters Patent is:

1. A modular, fully self-contained push-pull apparatus for unitary installation upon a conventional walkie type fork lift pallet truck having a power unit including at one end a tiller-operated drive wheel and at the other end a pair of liftable forks for providing conventional lifting of a pallet, said apparatus comprising a split platen including a pair of elongated platen members defining a slot between them, whereby said platen is of a forked character for engaging a conventional pallet if desired, said members being generally aligned with the respective forks and extending well beyond the ends of said forks, each of said platen members being of generally rectangular shape for including an outer edge of relatively thin character for contacting ground level upon tilting away from said platform away from said truck, each of said platen members being of flat plate-like character and each presenting a recess within the bottom surface thereof for receiving a respective one of said forks, said platen having at one end an upright frame extending upwardly from said platen proximate said power unit, a tilt control hydraulic motor interconnecting said upright frame with corresponding upright structure of said truck, means pivotally mounting said platen members to said forks for permitting tilting movement of said platen toward and away from said truck, said tilt control motor being actuable for effecting tilting movement of said platen toward and away from said truck, a push-pull mechanism including a scissors linkage, a pusher plate carried by said scissors linkage for movement across said platen upon extension and retraction of said scissors linkage relative to said upright frame, a scissors linkage actuating hydraulic motor for selective extension and retraction of said scissors linkage, gripper jaws associated with said pusher plate for gripping a loaded slip sheet for pulling a slip-sheeted load onto said platen, a gripper jaw actuating hydraulic motor for actuating said gripper jaws to grip and release said slip sheet, and a hydraulic power unit integrally carried by said push-pull apparatus for providing hydraulic fluid under pressure for operation of said tilt control motor, said scissors linkage actuating motor and said gripper jaw actuating motor.

2. Push-pull apparatus according to claim 1 and further characterized by each of said forks being provided with studs on opposite sides thereof, said platen members each having means for journably receiving the respective studs to define a tilting axis for said platen.

3. Push-pull apparatus according to claim 1 and further characterized by said scissors linkage, said vertical frame, and said hydraulic power unit being tiltable as a single unit with said platen.

4. Push-pull apparatus according to claim 3 and further characterized by said hydraulic power unit being of compact character and carried at one side of said upstanding frame and of electrohydraulic type adapted for receiving electric power for operation thereof from said truck, said frame defining a viewing aperture adjacent said power unit for operator observation of said push-pull apparatus in operation.

* * * * *